US008395666B1

(12) United States Patent  (10) Patent No.: US 8,395,666 B1
Steinberg et al.  (45) Date of Patent: Mar. 12, 2013

(54) AUTOMATED MEASUREMENT OF VIDEO QUALITY PARAMETERS

(75) Inventors: Victor Steinberg, Santa Clara, CA (US); Michael Shinsky, Santa Clara, CA (US)

(73) Assignee: Videoq, Inc., Santa Clara ( * ) Notice: Subject to any disclaimer, the term of this patent is extended or adjusted under 35 U.S.C. 154(b) by 59 days.

(21) Appl. No.: 13/225,476

(22) Filed: Sep. 4, 2011

(51) Int. Cl.
*H04N 17/00* (2006.01)
(52) U.S. Cl. .................................. 348/188; 348/187
(58) Field of Classification Search .......... 348/175–179, 348/187, 188, 254; 358/518, 448, 1.9, 1.13; 702/116
See application file for complete search history.

(56) References Cited

U.S. PATENT DOCUMENTS

| | | | |
|---|---|---|---|
| 4,575,124 A * | 3/1986 | Morrison | 283/115 |
| 5,760,829 A | 6/1998 | Sussmeier | |
| 5,874,991 A | 2/1999 | Steinberg et al. | |
| 6,437,823 B1 * | 8/2002 | Zhang | 348/187 |
| 6,654,493 B1 * | 11/2003 | Hilliard et al. | 382/167 |
| 6,791,716 B1 * | 9/2004 | Buhr et al. | 358/1.9 |
| 7,248,287 B1 * | 7/2007 | Sogawa et al. | 348/208.99 |
| 7,629,998 B2 * | 12/2009 | Elberbaum | 348/187 |
| 7,773,112 B2 * | 8/2010 | Whitling et al. | 348/180 |
| 8,139,117 B2 * | 3/2012 | Dwinell et al. | 348/188 |
| 2006/0274386 A1 * | 12/2006 | Wakazono et al. | 358/518 |
| 2011/0032380 A1 * | 2/2011 | Ishida | 348/223.1 |

* cited by examiner

*Primary Examiner* — Victor Kostak
(74) *Attorney, Agent, or Firm* — Tran & Associates (57) ABSTRACT

Methods, systems and software are disclosed for automated Measurement of Video Quality parameters. The system includes a static Test Pattern provided either in form of a Test Pattern File, converted via a standard playout device (test source) into analog or digital test signal and supplied to the input of a System Under Test, or in form of a Reflectance Chart installed before the front-end device of the System Under Test, such as TV camera. The system also includes a video capture device connected to the back-end device of the System Under Test, e.g. to the output of system decoder/player. A Video Quality Analyzer processes the captured video data and generates a detailed Analysis Report.

19 Claims, 10 Drawing Sheets

AUTOMATED MEASUREMENT OF VIDEO QUALITY PARAMETERS

BACKGROUND

With the introduction of advanced digital delivery systems for audio and video, there is an increased awareness of the relationship between subjective (perceived) quality and objective (measured) quality of video images presented to the observer's eye. Video quality is a characteristic of a video passed through a video transmission/processing system, a formal or informal measure of perceived video degradation (typically, compared to the original video). Video processing systems may introduce some noticeable amounts of distortion or artifacts in the video signal, so video quality evaluation is an important problem.

Currently there are many tools for analyzing video quality utilizing the Full Reference Methods (FR) such as dual-stimulus methodology based on calculation of differences between original and processed video data and subsequent transformation of these differences in accordance with predetermined metrics.

Typically, objective methods are often classified based on the availability of the original video signal, which is considered to be of high quality (generally not compressed). These metrics are usually used when the video coding method is known. PSNR (Peak Signal-to-Noise Ratio) is the most widely used objective video quality metric. However, PSNR values do not perfectly correlate with a perceived visual quality due to non-linear behavior of human visual system. The PSNR calculation on the pre-selected set of live clips is very long and tedious job, so in fact it is executed only during acceptance test of some large-scale systems. In other words, this methodology is not suitable for fast measurement of large quantity of different video processors and/or processing modes/profiles. More sophisticated metrics require even more calculations, thus they are even less suitable for fast objective measurements.

Moreover, PSNR compression artifacts metering implies that both A and B picture have same resolution, horizontal and vertical positions, video levels and (very important)—same frequency response, i.e. both pictures are perfectly aligned in space and time. Only under these conditions PSNR reading correlates well with subjective quality estimates. In modern content delivery systems such conditions are very seldom satisfied.

A second approach is represented by well established techniques of measuring objective video processing parameters on some artificial matrix test pattern. This approach captures video data and subsequently analyzes the captured video data. However, automatic video analyzers in this approach suffer from lack of flexibility: they are limited to a short list of video image resolutions and signal formats—any image size/position/resolution deviation from perfect match results in a failure of the analysis process. Additionally, analysis of pre-captured data files is not supported. With application to the analysis of video cameras performance, analyzers of this kind provide mainly waveform monitor functionality, i.e. only manual controls, thus excluding any automated analysis.

A third approach is represented, for example, by IE-Analyzer made by Image Engineering, Gmbh in Germany. This automated hardware/software tool is suitable for accurate and detailed camera performance analysis, but requires a nearly perfect setup of lighting conditions and camera's pan/zoom/tilt controls. IE-Analyzer can work with pre-captured files, but positioning of dotted lines delimiting the ROI (Region Of Interest) should be done manually. Moreover, for each reported parameter a different reflectance test chart or test pattern transparency is required, so the complete measurement process takes a long time, and nearly perfect studio conditions and highly skilled technical personnel are prerequisites.

SUMMARY

In a first aspect, methods, systems and software are disclosed for automated Measurement of Video Quality parameters. The system includes a static Test Pattern provided either in form of a Test Pattern File, converted via a standard playout device (test source) into analog or digital test signal and supplied to the input of a System Under Test, or in form of a Reflectance Chart installed before the front-end device of the System Under Test, such as TV camera. The system also includes a video capture device connected to the back-end device of the System Under Test, e.g. to the output of system decoder/player. A Video Quality Analyzer processes the captured video data and generates a detailed Analysis Report.

In a second aspect, a video monitoring system to perform automated Measurement of Video Quality parameters includes a static test pattern provided as a test pattern file or a reflectance chart, the test pattern file rendered by a device under test, the reflectance chart capture by a camera under test, wherein the device under test or the camera under test generates video data for analysis; and a video quality analyzer processor processes the video data into detailed analysis report.

Implementations of the above aspects may include one or more of the following. The Test Pattern contains video components equally suitable for (1) aural and visual estimation, (2) for on-line or off-line instrumental analysis, and (3) for fully automated on-line or off-line analysis. The Test Pattern components include several horizontal Test Bands, forming multi-row matrix, each band containing test pattern components specific for the particular sub-set of video quality parameters, such as video levels, frequency response, pulse response, etc., thus providing for a multitude of video test components combined in one test pattern, e.g. the said Test Pattern includes Test Bands consisting of (1) Color Bars, (2) Inverted Grayscale, (3) Direct Grayscale, (4) Frequency Bursts, (5) Multi-Pulse. The Test Pattern components also include special Geometry Reference Markers, and some more optional enhancement components on a flat color background, e.g. 50% Gray, such as Vertical Resolution Wedges and/or Radial Mires and/or Timing Reference dynamic components, e.g. clock dial or current video frame number display. The Geometry Reference Markers within the Test Pattern are implemented as several (typically four) small circles, filled with two contrast colors, e.g. White and Blue, thus providing for reliable differentiation of the said Markers from the rest of Test Pattern and accurate positioning of said circles centers locations within the captured video frame. The Geometry Reference Markers are located at four corners of the rectangle derived by the downscaling of the Test Pattern outer boundary with some known fixed scaling factor, e.g. 0.75. The XY co-ordinates of all Test Pattern components within is video frame are re-mapped for measurement purposes from their original (ideal) positions to their actual positions using the scaling and offset coefficients based on previously measured XY positions of Reference Markers. One or more Color Bars Band can be shown in two versions differing in color saturation: (1) full saturation version for Test Pattern File, i.e. for signal/data processors testing, and (2) reduced saturation version for Reflectance Chart, i.e. for video cameras testing. The Grayscale Bands can include optional Black Shallow Ramp Insert ("Near-Blacks") and/or White Shallow Ramp Insert ("Near-Whites"), purposed for more accurate YRGB Range Black Level Overload and YRGB Range White Level Overload measurements. The video quality analysis starts with the detection of the Reference Markers relative positions within the captured video frame (also used as a prove of Test Pattern and Test Setup validity) and finishes with the creation of the Report File(s) including the results of all measurement steps and Summary Table showing the Results Values in line with the user-defined Target Values. The number of video quality analysis steps in the said multi-step process depends on the detection of the valid Reference Markers relative positions, i.e. on Test Pattern and Test Setup validity. In case of successful detection of valid Reference Markers the video quality analysis include Image Geometry Measurements, Pulse Response Measurements, YUV/YRGB Levels measurements, Y Gamma and YRGB Range Overload Measurements, Frequency Response Measurements and Noise Measurements; but in case of unsuccessful Reference Markers detection the analysis process collapses to Noise Measurements only. A YUV/YRGB Levels analysis include the comparison of actual measured levels with a set of pre-calculated Reference Levels, whilst these Reference Levels in turn depend on automatic Test Chart Type detection (differing in full saturation vs. reduced saturation) and manual or automatic Color Scheme selection—two most important Color Schemes are "0-255" scheme, used mainly in computer graphics applications, and "16-235" scheme, commonly used in video applications. An automatic Color Scheme selection is based on the comparison of actual measured RGB levels with several sets of Reference Levels, each set representing Color Bars values for one Color Scheme; result is the selection of the Scheme providing for the smallest maximal error (minimum distance in the RGB color space). An automatic Test Chart Type selection can based on the comparison of actual measured RGB Color Bars levels with two sets of pre-calculated Reference Levels and the results of Color Saturation measurement based on the comparison of relative gain of Colored Pulse components in the Multi-Pulse Band—Y gain vs. UV gain.

Advantages of the preferred embodiments may include one or more of the following. The system uses EXACTLY THE SAME test pattern for cameras and video processors alike. This is more convenient than other systems that use EITHER video signal test matrix, suitable ONLY for video data processors, OR reflectance charts, suitable ONLY for cameras. These two types of test patterns traditionally used by other systems for two types of applications have no similarity at all. The system uses only ONE test pattern for a variety of opto-electronic systems, such as teleconference system. This universality allows users to insert and capture test data at any point in the signal processing chain—from camera lens to the very last decoder.

Other advantages of the preferred embodiments may include one or more of the following. The system accurately characterizes the most important objective parameters of video processing quality such as:

picture geometry described in simplified form as picture position and size video levels traditionally expressed in picture brightness, contrast, saturation and RGB values video image uniformity usually described in terms of horizontal and vertical "shading"

picture sharpness traditionally represented by pulse and frequency response values analog and digital noise artifacts traditionally represented by SNR values Objective measurement of the parameters listed above allows practical objective judgment on picture quality or more precisely "loss of quality in video processing workflow". For example, the proposed system can be used for a variety of applications to find in advance video image distortions associated with particular profile of video camera, video format conversion device and/or video compression codec. The system allows drastic improvement of speed, sophistication and completeness of automated video quality analysis. The system can create resolution-agnostic video quality metrics and a testing methodology for objective measurements of offline or online video processing path without any referral to particular live video content, but covering all practically used steps of this content processing—from the camera lens to the destination side video display input. The system is applicable for modern multi-format teleconference and content delivery environment.

Any consumer or professional system or device that has the ability to process video images or video data in order to deliver and/or display video and/or other multi-media content can use the objective measurement system. The system can also be beneficial for benchmarking purposes, e.g. for comparison of different cameras or compression codecs or comparison of different encoding profiles of the particular encoder. The system is especially useful where the data processing services are utilizing file-based environment for the preparation and delivery of video content. The system provides for fast and accurate analysis of all listed parameters. The software reliably works within the wide range of video image conditions in terms of image size and position, relatively big geometry errors, lighting non-uniformities and in presence of relatively high embedded noise.

BRIEF DESCRIPTION OF THE DRAWINGS

This system will now be described by way of example with reference to the accompanying drawings in which.

DESCRIPTION

The following description of the present system is done by the way of non-exclusive example of how the Video quality analyzer would work in an environment where video content is distributed through a video data delivery service such as a videoconferencing system.

One embodiment of the analyzer is software that runs on hardware or components readily available on the market. In the preferred embodiment, the present system consists of a standard off-the-shelf video capture device, e.g. Unigraf capture card, and software executable running under standard OS, e.g. Microsoft Windows. The system can determine the video quality of digital SD or HD TV and IPTV data processing cases, in particular—video cameras, compression codecs, scalers, TV sets, STBs, PCs, or portable devices.

The system performs automated Measurement of Video Quality parameters by a static Test Pattern provided either in form of a Test Pattern File, converted via a standard playout device (test source) into analog or digital test signal and supplied to the input of System Under Test, or in form of a Reflectance Chart installed before the front-end device of the System Under Test, such as TV camera. The test pattern is recorded as a data file by a video capture device connected to the back-end device of the System Under Test; e.g. to the output of system decoder/player. The test pattern is then analyzed by a video quality analyzer that in turn generates a detailed video quality Analysis Report.

Figure 1:
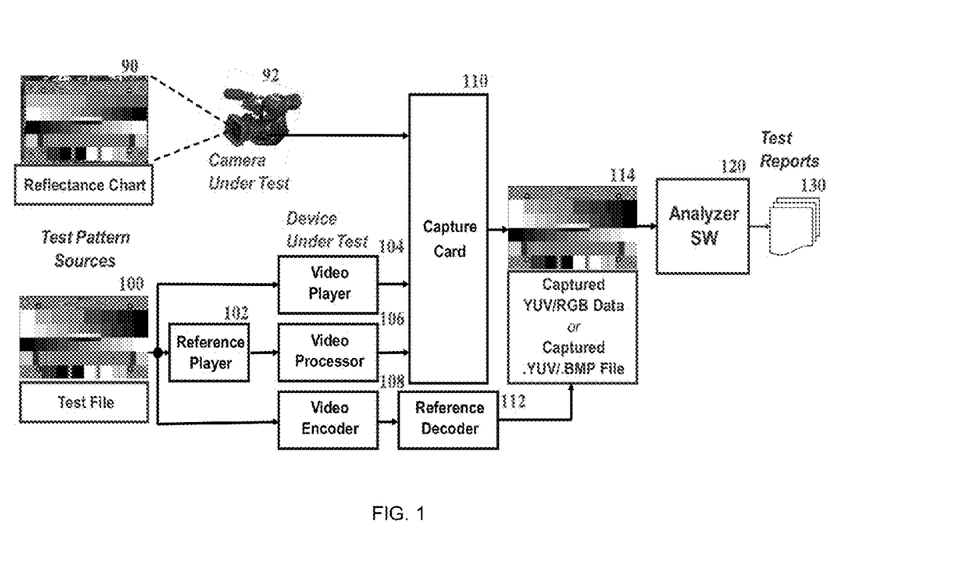
FIG. 1 shows variants of analysis workflow.

Referring initially to FIG. 1, a reflectance chart 90 is captured by a camera 92 whose output is directed connected to a computer (USB or FireWire) or through a capture card 110. Alternatively, a test file 100 can be played by a reference player 102 and provided to a video processor 106. The test file 100 can also be played by a video player 104. The output of video player 104 or video processor 106 can be captured by the capture card 110. The test file 100 can also be encoded by a video encoder 108, and decoded by a reference decoder 112 if the quality of the encoder/decoder is being tested. The output of the capture card 110 or the decoder 112 is a video file 114 that can be analyzed by a video quality analyzer 120 which generates report 130 that contains diagnostics data and data describing the quality of the video. The result is an Objective Picture Quality Metering System with practical application to software, hardware or hybrid devices. The system's measurement results contribute to the improvement of perceived quality of static or dynamic digital pictures.

One purpose of the video quality analyzer is to measure captured video files from any HD or SD source. With the Reflectance Chart 90, the system measures video cameras, but through a video player, processors and codecs the system can measure the overall performance of complex and sophisticated video data transmission chains.

Figure 2:
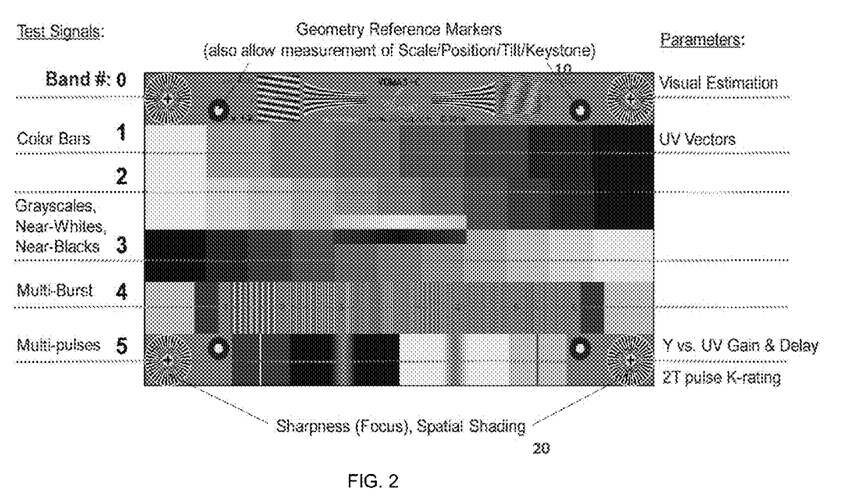
FIG. 2 illustrates an exemplary test pattern composition.

FIG. 2 illustrates an exemplary composition of a Test Pattern matrix. In this embodiment, a static matrix test pattern provides for automated measurement algorithms of all relevant video parameters. This test pattern could be also combined with live video content to provide objective video quality reference points along full video distribution chain—from content origination, through content re-purposing and distribution to final content consumption at the consumer display. Preferably, the same test pattern, both in form of optical reflectance chart and in form of video signal source, is used for consistent testing of full chain from camera lens to the display screen.

Turning to FIG. 2, each of five Bands from #1 to #5 is dedicated to a particular sub-set of video quality parameters. Band #0 contains several optional visual components, which are not related to automatic analysis. The test patterns also include Geometry Reference Markers 10, which provide for features such as:
1. Geometry checks, such as test chart scaling (zoom), XY offset (position); in case of Reflectance Chart they also serve to measure tilt and keystone parameters
2. Test Pattern Validation: if Reference Markers are not present (not detected) analysis process collapses to Noise Measurement only
3. All other measurements are using scaling/positioning coefficients calculated from the detected Reference Markers positions within the video frame.

The test pattern also includes a component 20 that provides for sharpness/spatial shading determination.

Figure 3:
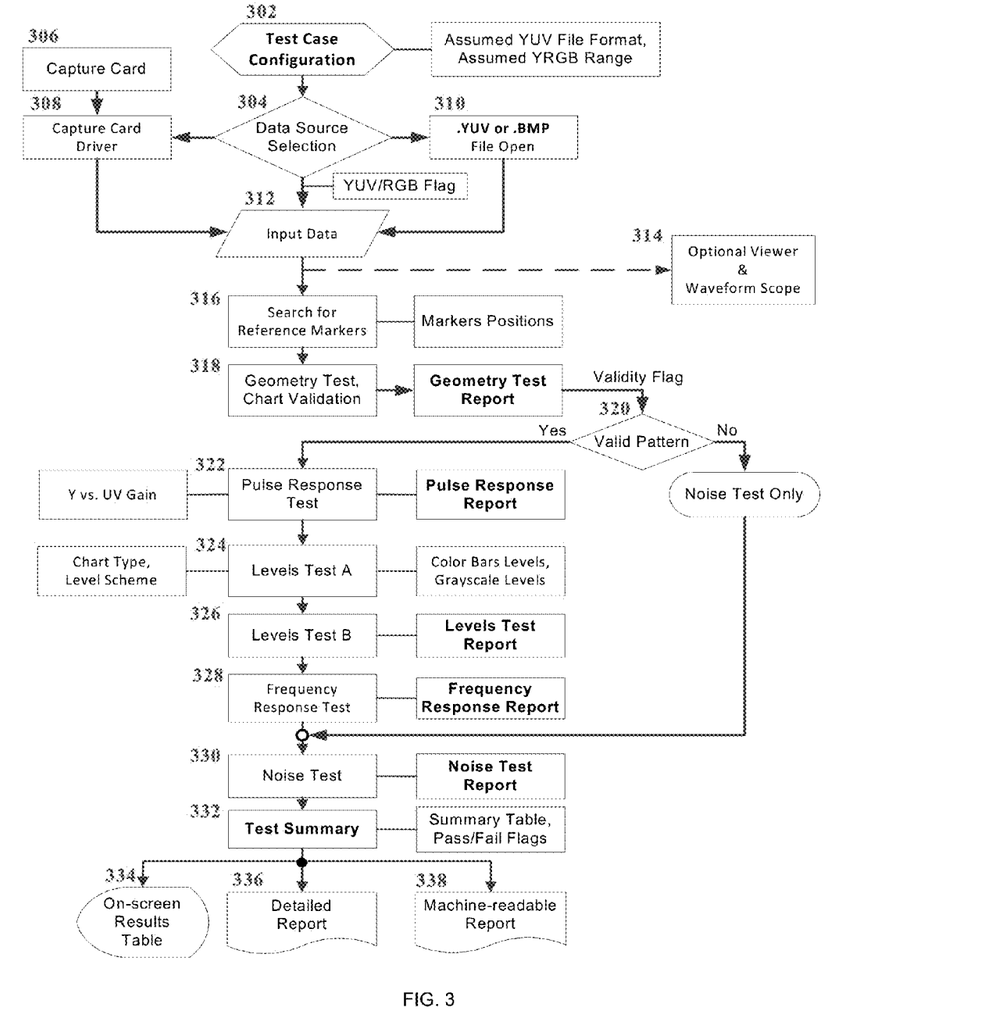
FIG. 3 shows an exemplary Software Workflow Diagram for a Video quality analyzer.

FIG. 3 shows an exemplary process to determine video quality. The first step 302 is Test Case configuration. At this stage User selects assumed YUV file format and optionally the assumed YRGB Range selection. This does not require any significant changes in the data processing algorithm, but may drastically change the presentation and interpretation of the analysis results.

Next, step 304 consists of data source selection: either live data from the capture card 306 via the driver 308, or pre-captured video data stored in the file 310. In both cases video data can be presented either in YUV (UYVY) format or in RGB format, among others. In one embodiment, the selection is stored in form of YUV/RGB Flag, used in all further calculations.

The result of the acquisition step 304 is large array of video data 312, which can be single video frame or small group of video frames, e.g. eight consecutive frames; this array should be processed during the subsequent steps. The size of this array must be large enough to accommodate the data. For example, at 1920×1080 resolution the required YUV data array size in bytes is 1920×1080×2×8=approximately 33 MB of RAM in one embodiment.

An optional Viewer and Waveform Scope module 314 allows user to preview incoming images and YUV/RGB waveforms of any line or averaged group of input video lines. The scope feature is useful in finding out the reasons of automated analysis failure, e.g. it may be caused by the incoming video data timing errors.

At step 316, in one embodiment, acquired data from all available video frames are first averaged to reduce harmful effect of embedded noise. The test pattern image is then split into four quadrants; each quadrant is searched at step 316 for the presence and position of Reference Markers 10 (FIG. 2).

At step 318, geometry test parameters, such as H & V position offset, H & V scaling coefficients, effective chart size (which can be smaller or bigger than video frame size), image tilt, keystone distortion, are put together and presented in a Geometry Test Report using predetermined commonly accepted units, e.g. in pixels and/or percents of image height. These parameters can be mathematically calculated based on differences between ideal and measured positions of Reference Markers, among others.

If all four Reference Markers are found in approximately correct positions, then a Test Pattern Validation Flag is activated. This flag is used in the Geometry Test Report and also serves to enable several further stages of automated analysis.

Acceptable marker positions cover wide range of scaling coefficients—from 110% down to 45% in one embodiment. However, the range of permitted offsets, tilts and keystone values should be rather small. For example, if chart image tilt exceeds 10 degrees, the rectangular arrangement of color patches within the Test Pattern Bands is significantly deteriorated. In such case the Validation Flag should be deactivated. Significant H or V offset also may cause complete loss of some test pattern components, so large offset values should be avoided. Thus, linear scaling (zoom) is permitted within reasonable limits, but other geometry transformations should be restricted.

All further steps rely on steps 316 and 318 in terms of re-mapped positions of all measurable components within the Bands #1, 2, 3, 4 and 5. For example, to find the co-ordinates of Frequency Burst labeled "1" and located on the Band #4 left side, its original (default) position should be re-mapped proportionally to the measured offsets of Reference Markers—as illustrated on FIG. 6.

If valid Test Matrix Pattern is not detected, then the whole analysis process collapses to Noise Test only—following the workflow control step 320. As described below, noise measurement does not rely on Reference Markers, so noise can be measured on any static image, such as full screen color bars or just flat full field color, e.g. gray field, among others. All results of step 318 are summarized in the Geometry Test Report.

At step 322 Band #5 (Pulses and Bars) is analyzed, resulting in K-factor value, measured on "white needle" pulse, and Y vs. UV Gain (Saturation), measured on soft green pulse.

The Y_vs_UV_Gain value is important. First, it describes general image quality deterioration—color saturation loss or excessive boost. Second, together with the color bars levels measurement results, it provides for automatic switching between two modes of operation of the video quality analyzer: "optical" reflectance chart mode and "electric" test pattern mode. This switch is created and applied later—at step 324. All results of step 322 are summarized in Pulse Response Test Report.

Step 324 consists of preliminary setting of modes of operation and finding the important general parameters, such as luminance signal dynamic range on Band #2 (Inverted Grayscale) and Band #3 (Grayscale), prior to detailed levels analysis applied at next step 326.

For greater robustness, Band #2 is mirrored and luminance values of two bands are averaged, thus minimizing harmful effects of non-uniform lighting—e.g. if lighting level linearly drops from left to right, then half-sum of left and right white patches levels is exactly equal to the white level in the middle portion of the picture.

One of the step 324 goals is distinguishing between two possible Color Schemes: 0-255 scheme, used mainly in computer graphics applications, and 16-235 scheme, commonly used in video applications.

The manual or automatic selection of Color Scheme is important in one embodiment because it affects the assumed nominal values of all colors in all bands. The selection of wrong Color Scheme may jeopardize all color analysis results. The comparison of actual color bars saturation, measured at step 324, with the Y_vs_UV_Gain value, measured at the previous step 322, allows distinguishing between "optical" reflectance chart mode and "electric" test pattern mode.

In optical mode color bars saturation is about 6 dB lower than Y_vs_UV_Gain value; in "electric" mode they should be approximately equal. This mode switching is needed to select appropriate reference YUV/RGB color bars values used to calculate color errors table.

At step 324 the Y channel "candidate" levels on black and white patches are tested against the decision thresholds set half-way between possible nominal values. The Default Scheme is 16-235 ("Video"). If average Y value on black patch is below 0.5*(0+16) and measured Y value on white patch is above 0.5*(255+235), then the Color Scheme 0-255 ("Computer Graphic") is selected.

At step 326 Bands #1 (Color Bars), #2 (Inverted Grayscale) and #3 (Grayscale) are split into several rectangular areas (patches); each patch contains only one color; examples are Yellow patch within the Color Bars or 100% White patch of Inverted Grayscale.

Video data within the central portion of each patch are averaged for further suppression of noise and other artefacts. This results in measured YUV and RGB values for all patches.

At step 326 the YUV/RGB Flag, set at step 304, is used to control the direction of color space conversion—either derivation of RGB values from YUV values (if acquired data are in YUV format) or vice versa derivation of YUV values from RGB values (if acquired data are in RGB format). YUV and RGB values of all patches are further processed to calculate standard colorimetric parameters, such as Black and White levels, Luminance Gamma, Dynamic Color Balance Errors, YUV and RGB values of Color Bars, etc. This includes application of well-known standard color space conversion coefficients and formulae.

For faster finding of erroneous color values in the presented result tables, special highlight flags can be created, marking the colors with maximal absolute errors (maximal RGB space distance from the correct nominal values).

Near-White and Near-Black inserts within the Bands #2 and #3 require special processing. Unlike other color patches, these components of test pattern contain linear gradients, so called shallow ramps.

YRGB range overloading, e.g. caused by excessive opening of camera's iris or by "black level crash" of video processor, can be detected in form in clipping of these shallow ramps.

The size of clipped area is directly proportional to the overload strength (percentage of lost dynamic range). Count of clipped pixels, divided by the total number of pixels in this test pattern component, represents the percentage of detected overload. All results of step 326 are summarized in Levels Test Report.

At step 328 central portions of all frequency bursts within Band #4 are measured. This creates six pairs of arrays containing peak and trough values. Differences between peaks and troughs are averaged, thus finding out the average contrast of each burst. The contrast values are then referenced to interpolated contrast of dark gray and light gray patches on both sides of the Band.

Figure 9:
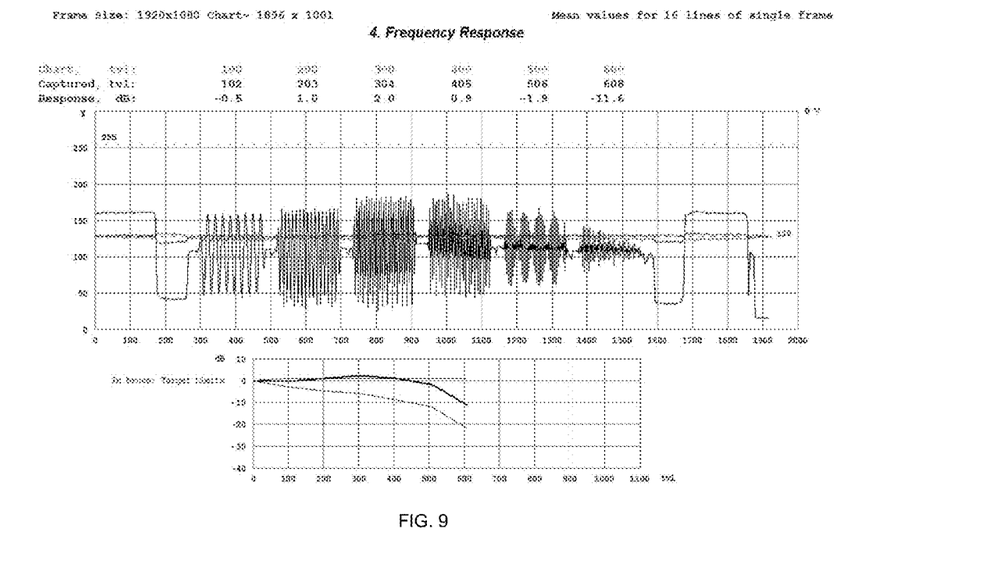
FIG. 9 shows exemplary Frequency Response Test Results.

Relative contrast values represent individual bursts positions along the vertical axis of Frequency Response Plot shown on FIG. 9.

Horizontal axis positions on the Frequency Response Plot, i.e. actual frequencies of the captured bursts, are calculated by scaling original "pristine" burst frequencies in accordance with the H scaling coefficient measured at step 318. All results of step 328 are summarized in Frequency Response Test Report.

Step 330 (noise analysis) includes several stages of spatial and temporal filtering. The goal of this filtering is the separation of random noise YUV values from static YUV values of the test pattern itself. Important feature of this filtering is the preservation of noise horizontal spectrum shape.

Because any horizontal filtering is undesirable, noise separation process consists of vertical-temporal high-pass filtering. The first stage is temporal filtering, achieved by deduction of the central frame YUV values from the average YUV values across eight adjacent video frames. The second stage is vertical filtering. Many modern video processors involve video line averaging; typical vertical aperture size of such processor is from two to five video lines. This may produce a noise of specific type—highly correlated in vertical dimension. Accurate measurement of such noise requires vertical filters with the aperture size much larger than the incoming noise vertical correlation interval.

This is implemented at step 330 by adding together the powers (energy) of YUV differences taken across eight video lines. Eight TV lines is big enough vertical distance, allowing to overcome the abovementioned problem of vertically correlated video noise handling.

Filtered out noise, separate values for Y, U, V, R, G, and B channels, is then processed by standard statistical formulae, resulting in standard deviations, histograms and Y noise horizontal spectrum plots—with and without weighting filters.

The separated noise values are presented as a viewable image with "boosted" contrast. This noise image together with the horizontal spectrum plot allows advanced user to distinguish truly random noise from periodic interferences, such as cross-talks or digital clock pick-ups. The results of step 330 are summarized in Noise Test Report.

At every step for user convenience all partial test result reports are presented as plots and tables on several separate pages (windows), i.e. Geometry Page, Levels Page, among others.

At step 332 the most important Test Results are compared with the user-defined target values and presented in three formats:
1. On-screen Results Summary Table 334
2. Detailed printable Report 336, e.g. PDF file
3. Machine-readable Report 338, e.g. Excel spreadsheet file.

FIGS. 4-10 show exemplary test results.

Figure 4:
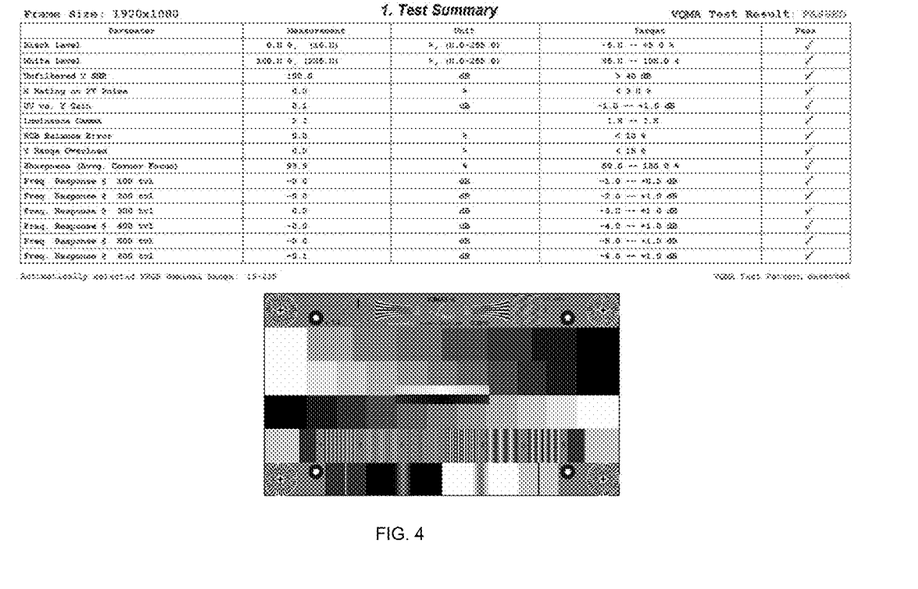
FIG. 4 shows an exemplary Test Result Summary Table for 1920×1080 image resolution.

FIG. 4 shows an example of a Test Results Summary Table for 1920×1080 image resolution. The Summary Table shows the measured video quality parameters and corresponding target values (user-defined tolerances). If the measured result is within the target range, then this row of the table shows green tick (pass mark) in the Pass/Fail column. If the measured result is outside of the target range, then green tick is replaced by a red cross (failure mark). The scoring of these pass/fail marks provides for fully automated (unattended) analysis mode. For example, in the strictest variant, appearance of just one red cross in any row means that system or device does not pass the test. A thumbnail picture at the bottom of the Summary Page serves mainly for quick visual estimate of general test conditions. For example, significant Reflectance Chart tilt or lighting non-uniformity may invalidate all test results.

Figure 5:
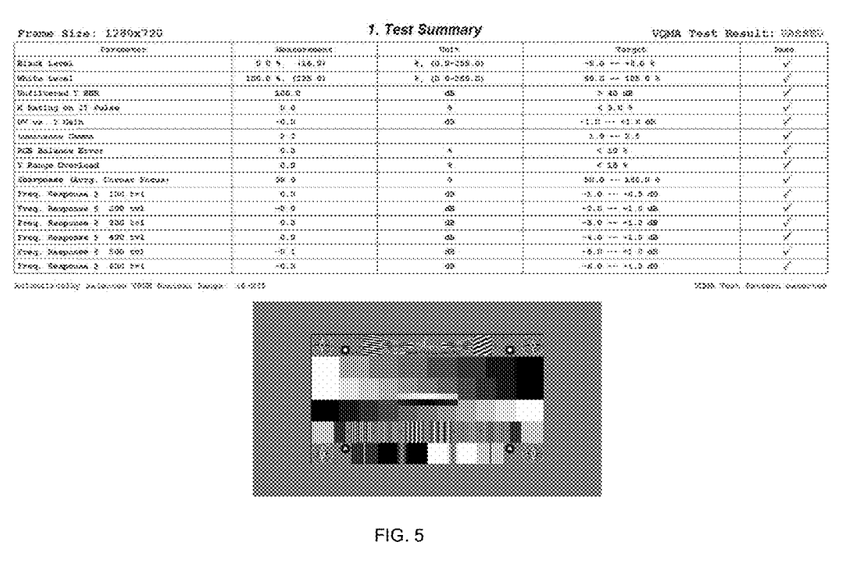
FIG. 5 shows an exemplary Test Result Summary Table for 1280×720 image resolution.

FIG. 5 shows an example of Test Results Summary Table for 1280×720 image resolution. The main difference against FIG. 4 is the size of the thumbnail picture; this display allows quick visual check of actual video data resolution.

Figure 6:
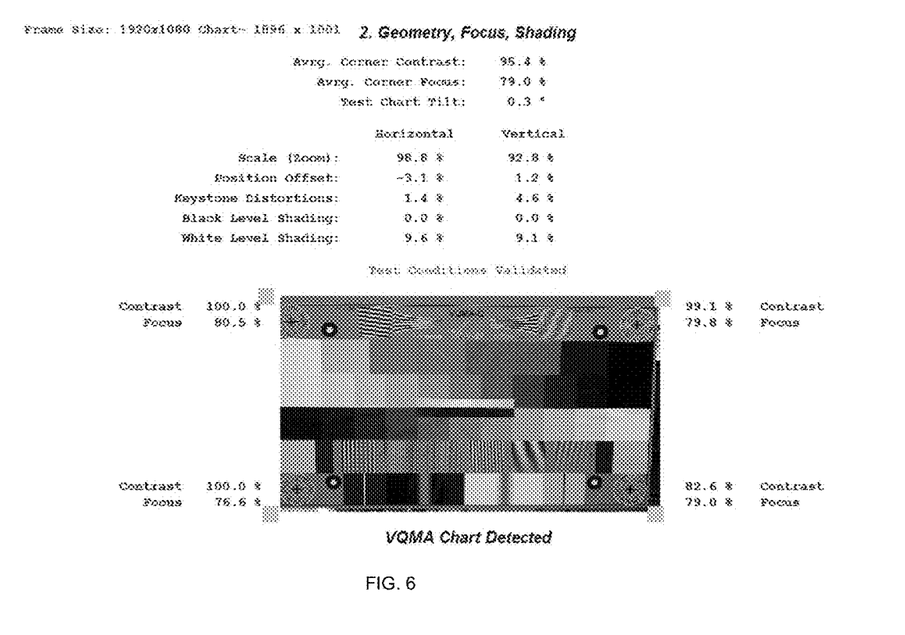
FIG. 6 shows an exemplary Geometry Test Result for Reflectance Chart.

FIG. 6 shows one example of Geometry Test Results for Reflectance Chart. In this example, the inner corners of four green squares indicate calculated positions of the four corners of Test Chart. Their positions are calculated by extrapolation of the measured positions of four blue-white Reference Markers. Despite the fact that upper-left and bottom-left corners are not visible their calculated positions are contributing to the final results.

Figure 7:
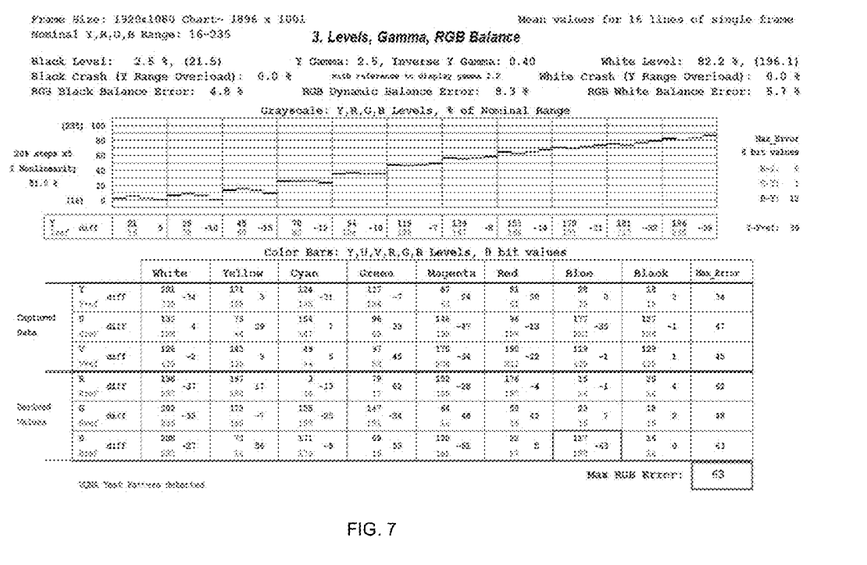
FIG. 7 shows exemplary Video Level Test Results.

Turning now to FIG. 7, an example of Video Levels Test Results is shown. The page contains many partial parameters; together they give comprehensive presentation of Y, R, G, and B gradations rendition and inter-channel misbalances. Black Level and White Level are presented in % of the selected nominal YRGB range and also in D18 bit levels. Luminance Gamma is calculated by best fitting method on 9 of 11 staircase porches; two lowest porches are ignored to minimize noise and glare related effects. RGB Dynamic Balance Error is a maximum of R-G, B-G and R-B magnitudes of all 11 staircase porches. Black Balance Error and White Balance Error are calculated similarly, but only the lowest (Black) and the highest (White) porches are used. Black Crash and White Crash (Y Range Overload) are measured by finding the clipping level of shallow ramps in the central area of the Test Pattern. The bottom half of the page is occupied by Color Bars Table. It contains YUV and RGB levels of the test pattern measured on Band #1. The Table also shows (in Gray) the reference values of 100/0/75/0 Color Bars corresponding to the selected Nominal Range (16-235 or 0-255). The right half of each cell shows calculated Color Bar Errors, i.e. differences between measured and reference values. Video data can come as YUV or as RGB. Values within the "Captured Data" part of the Table are YUV or RGB data, averaged and rounded to 8 bit values without any mapping or scaling. Values within the "Derived Values" part of the Table are results of application of standard Color Space Conversion Matrix to the input data; these results are also rounded to 8 bit and compared with the corresponding 8 bit reference values.

Figure 8:
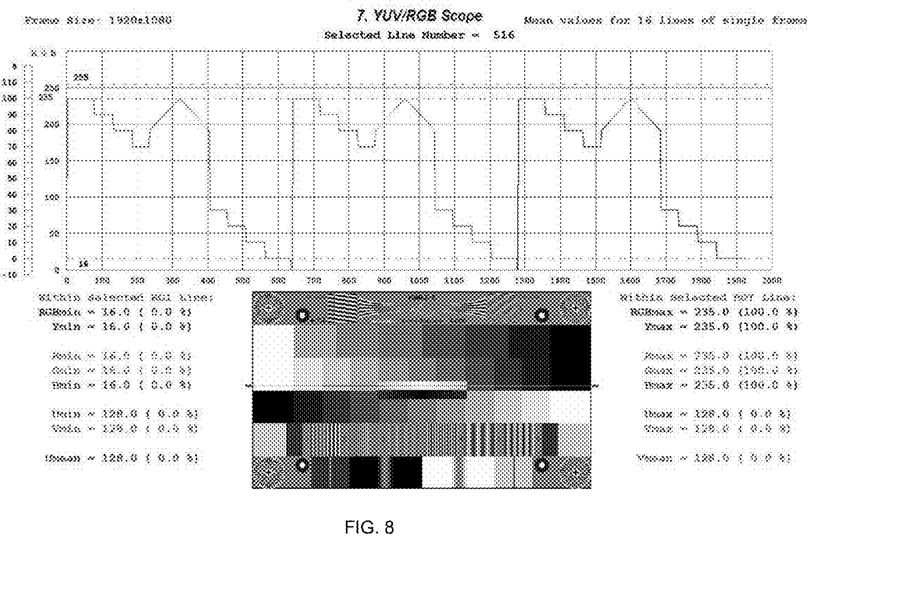
FIG. 8 shows exemplary details of Near-White Test Pattern used at Levels Test stage.

Referring now to FIG. 8, exemplary details of Near-White Test Pattern used at Levels Test stage are shown. In this example all three shallow ramps of R, G and B channels are not distorted—the ramp waveforms are linear and not clipped.

FIG. 9 shows another example of Frequency Response Test Results. This page shows the measured averaged peak-to-peak amplitudes of six frequency bursts and display of averaged luminance waveform of multi-burst band (Band 4). The burst amplitudes are expressed in dB with respect to nominal (undistorted) value. This band of test pattern includes special reference bars with levels exactly matching the nominal burst amplitude. The measurement algorithm checks these bars first, and automatically compensates for any non-standard Black Level and White Level conditions, including Levels Tilt. This allows the frequency response measurement to be always accurate and correct, independent of any lighting, setup or gain errors in Y channel. Frequencies are shown above the response values in two formats: original (pristine chart) values are shown in gray, and actual scaled values in black. In the example shown they differ only slightly because the camera zoom (98%) is very close to 100%. Scaled frequency values are also used for plotting the response curve at the bottom of the page. On the frequency response plot the measured values are shown in blue, target limits are shown in brown.

Figure 10:
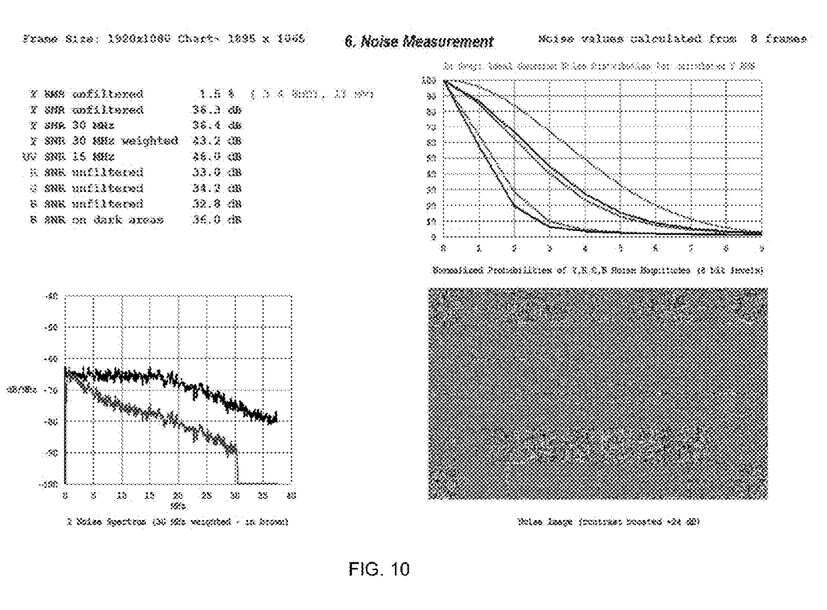
FIG. 10 shows exemplary Noise Analysis Test Results.

FIG. 10 shows yet another example of Noise Analysis Test Results. The most important noise parameter is RMS noise level of Y channel displayed in the upper left corner of the page using three types of units:
a) % of Nominal White
b) D18 bit levels (in brackets)
c) Equivalent mV of analog Y signal (also in brackets)

Other important noise parameters present on this display are:
a) Y channel SNR, calculated in three variants: unfiltered, band-limited and weighted.
   The Y RMS value (shown above the Y SNR) directly correlates with unfiltered Y SNR.
b) UV SNR, derived from band-limited unweighted sum of scaled U noise and V noise
c) R, G, B and "Dark B" SNR values, derived from Y and UV SNRs A histogram display in the upper right corner allows differentiation between truly random Gaussian (i.e. unprocessed) noise and "cored" noise signal typically produced by noise reducers. If Y and G histogram plots are close to ideal Gaussian curve shown in gray, then the effect of noise reduction is rather small.

In the example shown the difference between two curves is very large, which indicates that camera processor applied very deep noise reduction reducing the relative probabilities of low noise magnitudes vs. high magnitudes.

Bottom part of the page contains Y Noise Spectral Density plots in dB/MHz for unlimited and weighted noise spectra and also Noise Image with boosted contrast. These two displays allow to see the effect of device under test frequency response and also to distinguish random noise from the contributions by regular textures, e.g. from those caused by RF interference or digital clock pick-up.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A video monitoring system to perform automated Measurement of Video Quality parameters, comprising:
    a static test pattern provided as a test pattern file rendered by a device under test or a reflectance chart captured by a camera under test, wherein the test pattern file is identical to the reflectance chart;
    a video capture device coupled to the device under test or camera under test to generate video data for analysis; and
    a video quality analyzer processor processing the video data into an analysis report, wherein the test pattern includes a multitude of video test components combined in one test pattern including horizontal test bands forming a multi-row matrix, each test band containing test pattern components specific for a particular sub-set of video quality parameters.

2. The system of claim 1, wherein the test pattern contains video components for (1) audiovisual estimation, (2) on-line or off-line instrumental analysis, and (3) fully automated on-line or off-line analysis.

3. The system of claim 1, wherein the test pattern includes test bands consisting of Color Bars, Inverted Grayscale, Direct Grayscale, Frequency Bursts, and Multi-Pulse.

4. The system of claim 1, wherein the test pattern components include Geometry Reference Markers, and optional enhancement components on a flat color background.

5. The system of claim 4, wherein the Geometry Reference Markers within the Test Pattern comprise circles, filled with two contrast colors providing for differentiation of the said Markers from the rest of test pattern and positioning of said circle centers locations within the captured video frame.

6. The system of claim 4, wherein the Geometry Reference Markers are located at four corners of the rectangle derived by downscaling of a Test Pattern outer boundary with a fixed scaling factor.

7. The system of claim 1, wherein XY co-ordinates of the test pattern components within a video frame are re-mapped for measurement purposes from original positions to actual positions using the scaling and offset coefficients based on previously measured XY positions of the Reference Markers.

8. The system of claim 1, comprising one or more Color Bars Band shown in two versions differing in color saturation: (1) full saturation version for Test Pattern File and (2) reduced saturation version for Reflectance Chart.

9. The system of claim 1, wherein the Grayscale Bands include one of: a Black Shallow Ramp Insert ("Near-Blacks"), and a White Shallow Ramp Insert ("Near-Whites"), purposed for YRGB Range Black Level Overload and YRGB Range White Level Overload measurements.

10. The system of claim 1, wherein the video quality analyzer starts with the detection of the Reference Markers' relative positions within the captured video frame and finishes with the creation of Report File(s) including the results of all measurement steps and Summary Table showing the Results Values in line with the user-defined Target Values.

11. The system of claim 1, wherein the number of video quality analysis steps depends on a detection of valid Reference Markers' relative positions.

12. The system of claim 1, wherein after successful detection of valid Reference Markers, the video quality analysis includes Image Geometry Measurements, Pulse Response Measurements, YUV/YRGB Levels measurements, Y Gamma and YRGB Range Overload Measurements, Frequency Response Measurements and Noise Measurements.

13. The system of claim 1, wherein after unsuccessful Reference Markers detection, the video quality analysis comprises Noise Measurements only.

14. The system of claim 1, wherein the video quality analyzer performs a YUV/YRGB Levels analysis including a comparison of actual measured levels with a set of pre-calculated Reference Levels, whilst these Reference Levels in turn depend on automatic Test Chart Type detection (differing in full saturation vs. reduced saturation) and manual or automatic Color Scheme selection.

15. The system of claim 1, wherein an automatic Color Scheme is selected based on a comparison of actual measured RGB levels with several sets of Reference Levels, each set representing Color Bars values for one Color Scheme to select a Scheme providing for the smallest maximal error (minimum distance in the RGB color space).

16. The system of claim 1, wherein the video quality analyzer performs automatic Test Chart Type selection based on a comparison of actual measured RGB Color Bars levels with two sets of pre-calculated Reference Levels and the results of Color Saturation measurement based on a comparison of relative gain of Colored Pulse components in the Multi-Pulse Band—Y gain vs. UV gain.

17. The system of claim 1, wherein the test pattern contains video components for (1) audiovisual estimation, (2) on-line or off-line instrumental analysis, and (3) fully automated on-line or off-line analysis, wherein the test pattern includes a multitude of video test components combined in one test pattern including horizontal test bands forming a multi-row matrix, each test band containing test pattern components specific for a particular sub-set of video quality parameters, wherein the test pattern includes test bands consisting of Color Bars, Inverted Grayscale, Direct Grayscale, Frequency Bursts, and Multi-Pulse, wherein the test pattern components include special Geometry Reference Markers, and optional enhancement components on a flat color background, and wherein the Geometry Reference Markers within the Test Pattern comprise small circles, filled with two contrast colors providing for reliable differentiation of the said Markers from the rest of test pattern and accurate positioning of said circle centers locations within the captured video frame.

18. The system of claim 1, wherein after successful detection of valid Reference Markers, the video quality analyzer performs Image Geometry Measurements, Pulse Response Measurements, YUV/YRGB Levels measurements, Y Gamma and YRGB Range Overload Measurements, Frequency Response Measurements and Noise Measurements and wherein, after unsuccessful Reference Markers detection, the video quality analyzer performs Noise Measurements only.

19. The system of claim 1, wherein the video quality analyzer performs a YUV/YRGB Levels analysis including a comparison of actual measured levels with a set of pre-calculated Reference Levels, whilst these Reference Levels in turn depend on automatic Test Chart Type detection (differing in full saturation vs. reduced saturation) and manual or automatic Color Scheme selection and wherein an automatic Color Scheme is selected based on a comparison of actual measured RGB levels with several sets of Reference Levels, each set representing Color Bars values for one Color Scheme to select a Scheme providing for the smallest maximal error (minimum distance in the RGB color space).

* * * * *